United States Patent [19]
Wilkerson

[11] 3,954,612
[45] May 4, 1976

[54] SEPTIC TANK SYSTEM
[76] Inventor: Anderson L. Wilkerson, Rte. 4, Box 57, Temple, Tex. 76501
[22] Filed: June 26, 1974
[21] Appl. No.: 483,219

[52] U.S. Cl.................................... 210/86; 61/11; 73/305; 116/118 A; 166/54; 210/91; 210/93; 210/121; 210/532 S
[51] Int. Cl.²........................................ G01F 23/06
[58] Field of Search............ 61/11, 13; 73/305, 319, 73/322; 116/118 A; 138/104; 210/86, 91, 93, 121, 170, 532 S; 166/54, 113

[56] References Cited
UNITED STATES PATENTS

| | | | |
|---|---|---|---|
| 933,121 | 9/1909 | Schofield | 210/532 S |
| 988,639 | 4/1911 | Johnston | 61/13 |
| 1,029,107 | 6/1912 | Couls | 61/13 X |
| 2,674,337 | 4/1954 | Noe | 61/11 |
| 2,802,339 | 8/1957 | Fogerty | 61/11 |
| 3,332,552 | 7/1967 | Zabel | 210/532 S |
| 3,483,656 | 12/1969 | Baumann | 73/322 X |
| 3,892,126 | 7/1975 | Curtin | 73/322 X |

FOREIGN PATENTS OR APPLICATIONS 287,809  5/1914  Germany .................................. 61/11

Primary Examiner—Charles N. Hart
Assistant Examiner—Robert G. Mukai
Attorney, Agent, or Firm—Jennings B. Thompson

[57] ABSTRACT

A septic tank system is provided with an indicator above the ground surface to indicate the water level in the tributaries leading from the tank so that any excess water therein may be pumped out before it causes a back up of sewage upstream of the septic tank.

2 Claims, 4 Drawing Figures

SEPTIC TANK SYSTEM

This invention relates to septic tank systems generally, and in particular to such systems that include tributaries through which the effluent from the septic tank is distributed into the ground.

In the usual septic tank system, the raw sewage flows into the septic tank where it is digested due to the action of anaerobic bacteria. The liquid effluent is drawn from beneath the surface of the liquid in the septic tank and flows into a drainage bed which may consist of one or more tributaries comprising gravel filled ditches located below the surface of the ground. The liquid effluent trickles through the gravel into the top soil where it is aerated and drawn into the roots of vegetation or evaporates into the air.

The ability of a drainage bed to dispose of the effluent of the septic tank varies with surrounding soil conditions. For example, in rainy weather the ground adjacent the tributaries receives surface water as well as water from the bed and the rate that water can be disposed of through the drainage bed is necessarily reduced. This can cause the level of liquid in the drainage bed to rise. There also may be occasions when the rate of flow of effluent into the drainage bed is more than the bed can handle. This can occur for various reasons. For example, occasionally the ball valve of a water closet will fail to close allowing water to flow into the sewer system continuously until someone notices the running water and corrects the problem. If not corrected for a long period, the drainage bed of the septic tank system will completely fill with effluent from the septic tank. When this occurs, no more effluent can enter the drainage bed and sewage will begin to back up into the house or building connected to the sewage system. This will be the first and only indication to the operator of the system that the flow of effluent is exceeding the capacity of the drainage bed. By then, however, the system is inoperative. This is a very disagreeable and troublesome problem and one that cannot be readily corrected except to stop the flow of sewage into the septic tank to allow the water in the drainage bed to eventually soak into the ground to where normal sewage operations can be resumed.

It is an object of this invention to provide a septic tank system that will provide an indication of the liquid level in the drainage bed tributaries for the system so that the operator or owner of the system can quickly and easily monitor the performance of the tributaries.

It is another object of this invention to provide a septic tank system wherein the water level of the effluent from the septic tank in the tributaries of the drainage bed can be monitored at all times to allow any excess build up of effluent in the beds to be removed therefrom before the level of effluent in the tributaries causes the sewage to back up upstream of the septic tank.

It is a further object of this invention to provide a septic tank system wherein excess liquid in the tributaries of the drainage bed can be quickly and easily removed therefrom without interfering with the operation of the septic tank system.

These and other objects, advantages, and features of this invention will be apparent to those skilled in the art from a consideration of this specification, including the attached drawings and appended claims.

Figure 1:
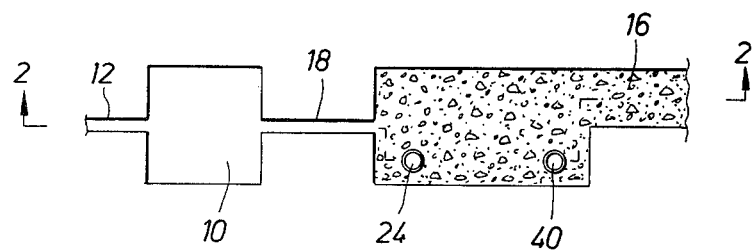
FIG. 1 is a plan view of a septic tank system embodying this invention, with the drainage bed connected to the septic tank shown in section.
Figure 2:
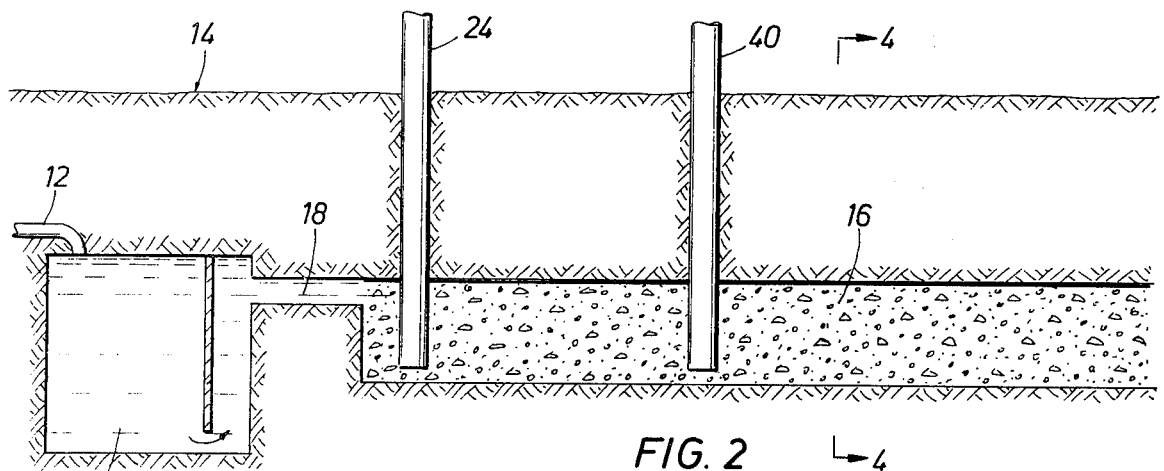
FIG. 2 is a sectional view taken along line 2—2 of FIG. 1.

Raw sewage from the building served by the septic tank system shown in the drawings enters septic tank 10 through inlet line 12. Septic tank 10 is buried below surface 14 of the ground in the conventional manner. The septic tank is designed to retain the solids in the sewage while allowing the liquid to flow through. The tank should contain bacteria to attack the solids. The liquid effluent from septic tank 10 flows into drainage bed or tributary 16 through outlet 18. Tributary 16 is in the form of a rectangular ditch in the embodiment shown, located below surface 14 of the ground and filled with gravel or the like to keep the ditch from filling up with dirt from above. The liquid effluent flows through the gravel into the adjacent ground.

Figure 4:
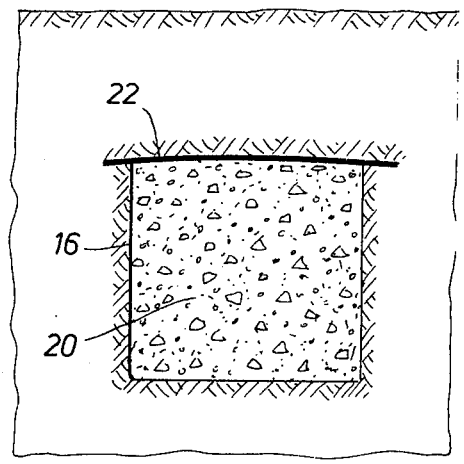
FIG. 4 is a sectional view taken along line 4—4 of FIG. 2.

Since rain water soaking into the drainage bed of a septic tank system is one of the reasons that the bed can become overloaded with an excessive amount of water, it is one of the features of this invention to cover the top of gravel bed 20 in the tributary, as shown in FIG. 4, with layer 22 of water impervious material, such as composition roofing material, before covering the gravel filled ditch with dirt. This will tend to keep water seeping into the ground from the surface due to rain or the like from at least directly entering the tributary. It also provides a barrier for the dirt above the gravel bed in the tributary to keep water soaking through the ground into the gravel bed from carrying dirt into the ditch and depositing the dirt in the interstices between adjacent gravel particles and decreasing the ability of water to flow through the gravel bed.

In accordance with this invention, means are provided to indicate the level of liquid in the tributary to allow excess liquid to be pumped out before it causes sewage to back up in the inlet to the septic tank. In the embodiment shown, a conduit comprising pipe 24 is positioned to extend from above surface 14 of the ground into tributary 16. The tributary at this point is provided with an increased width, as shown in FIG. 1, so that pipe 24 is located out of the direct stream of effluent from the septic tank.

Figure 3:
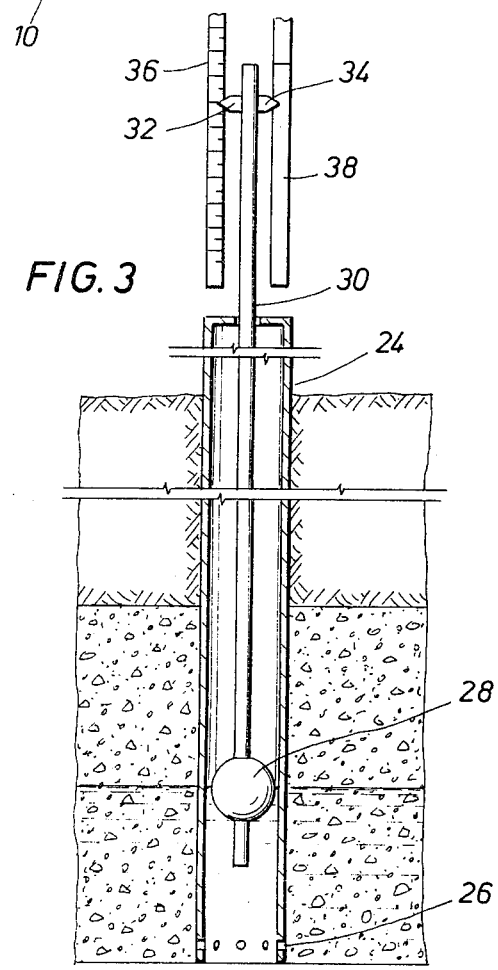
FIG. 3 is a sectional view on an enlarged scale taken along line 3—3 of FIG. 2.

The lower end of pipe 24 is provided with perforations 26 to allow liquid to enter the pipe even though the bottom of the pipe is closed which may be desirable so that the end of the pipe can rest on the bottom of the tributary, as shown in FIG. 3. Openings 26 allow the liquid in the tributary to rise in pipe 24 to the level of the liquid in the tributary itself. If desired, a screen can be placed around the bottom of the pipe to keep gravel and the like from plugging up openings 26 and entering pipe 24. Float 28 is positioned in pipe 24 to ride on the surface of the liquid in the pipe. The float is connected to indicator rod 30 that extends upwardly through pipe 24 to move pointers 32 and 34 vertically in response to changes in the level of liquid in pipe 24. Scale 36 can be calibrated to indicate inches of water in the tributary. Scale 38, adjacent pointer 34, can be used to indicate a safe zone and a danger zone and even a caution zone in between, if desired, so that a quick look will indicate whether or not the liquid level in the tributary is approaching a point where something should be done. Different colors can be used for each zone. The pointers could also be arranged to close a switch (not shown) and actuates a warning light or alarm when the liquid level reaches a predetermined height.

Means are provided to allow the excess liquid in the tributary to be removed when the liquid level in the tributary, as shown by the position of pointers 32 and 34, indicates that the capacity of the tributary is about to be exceeded, after which sewage will begin to back up in the system. In the embodiment shown, pipe 40 is positioned adjacent pipe 24 and extends from the surface of the ground into the enlarged portion of tributary 16, as shown in FIG. 1. This pipe can be provided with perforations in the same manner as pipe 24. The suction hose of a pump is placed in pipe 40, or the pipe can act as a suction pipe, and water is removed until the water level in the tributary drops to a safe working level. It should also be provided with a screen around the bottom to keep gravel from being pulled into the pipe by the flow of water into the pipe during the pumping operation.

Thus, in accordance with this invention, any excess accumulation of liquids in the tributaries of a septic tank system can be quickly detected and easily removed without interfering in any way with the operations of the septic tank system, and before any sewage is backed up into the house or building being served by the system.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having been described, what is claimed is:

1. A septic tank system comprising a septic tank having an inlet to receive sewage and an outlet located just below the top of the septic tank through which the liquid effluent from the tank can flow, a tributary connected to the outlet to receive the effluent and to allow the effluent to soak into the ground, said tributary comprising an elongated ditch that is filled with gravel or the like to about the top of the outlet, means located in the tributary for indicating above the surface of the ground the level of effluent in the tributary, said indicating means including a first vertical conduit extending from above the surface of the ground to the bottom of the ditch forming the tributary, said conduit having openings therein and screen means associated with said openings having a mesh size selected to permit liquid to enter the conduit but to prevent the gravel in the ditch from entering the pipe to allow effluent in the tributary to flow into the conduit to the level of the effluent in the tributary, a float located in the conduit to float in the effluent in the conduit, and means attached to the float and extending above the ground surface to indicate the effluent level in the tributary, and means through which excess effluent may be pumped directly out of the tributary before it causes sewage to back up in the inlet to the septic tank, said means through which the excess effluent may be pumped including a second conduit extending from the surface of the ground through the gravel to about the bottom of the tributary, said second conduit having perforations adjacent the bottom thereof and screen means associated with said perforations having a mesh size selected such that the gravel in the ditch cannot enter the conduit while liquid effluent can to allow the effluent to be pumped out of the tributary to substantially remove all of the liquid effluent from the ditch.

2. The system of claim 1 in which the tributary includes a section of increased width to provide a cavity adjacent the tributary into which the effluent in the tributary can flow and in which the first and second conduits can be located out of the direct line of flow of effluent in the tributary.

* * * * *